Patented Oct. 28, 1941

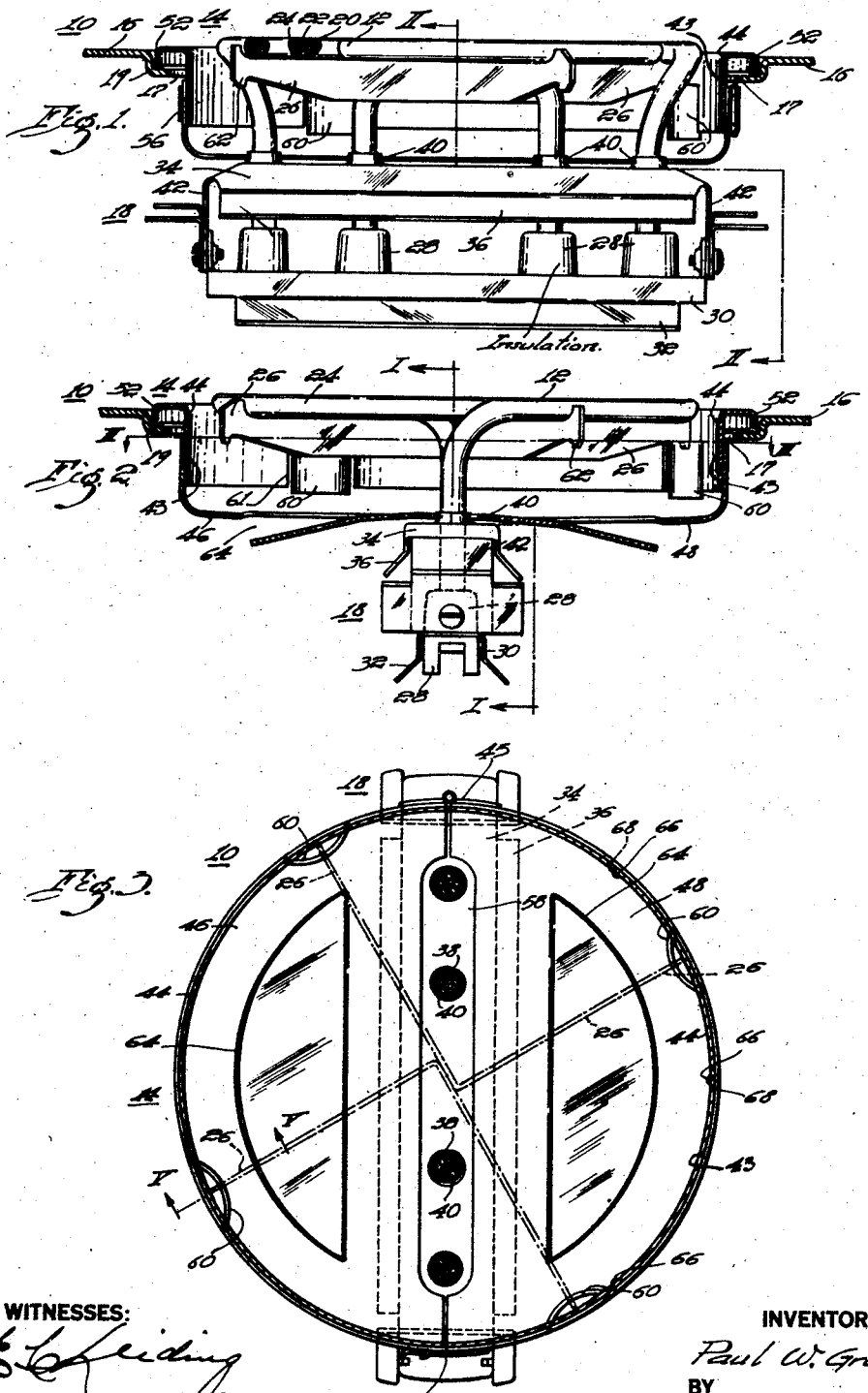

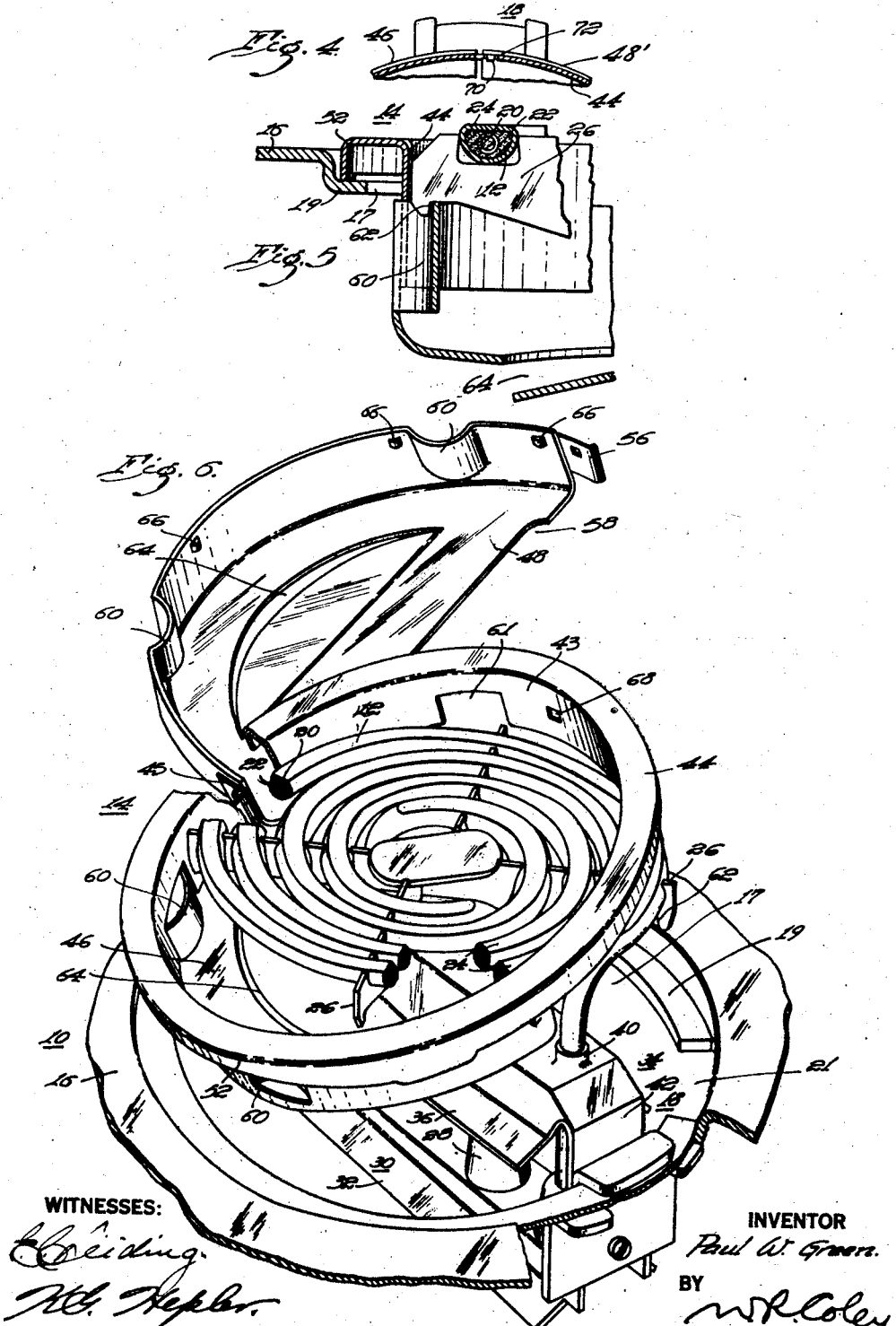

2,260,792

UNITED STATES PATENT OFFICE 2,260,792

HEATING UNIT

Paul W. Green, Mansfield, Ohio, assignor to Westinghouse Electric & Manufacturing Company, East Pittsburgh, Pa., a corporation of Pennsylvania Application May 16, 1939, Serial No. 273,860

4 Claims. (Cl. 219—37)

My invention relates to heating units, and more particularly, to a range surface unit, or the like, having a removable supporting pan structure. This application is an improvement over W. J. Russell's copending application Serial No. 264,775, filed March 29, 1939, which has been assigned to the assignee of this application, and is related to my copending application Serial No. 273,859, filed May 16, 1939.

An object of my invention is to provide a heating unit having a heating element, and a removable pan structure which is adapted to support the unit substantially in the plane of a supporting platform when such unit is in its normal operating position and which includes a movable bottom portion adapted to be moved away from the heating element when the unit is in an elevated position to permit the pan structure to be easily removed from such element and to be thoroughly cleaned.

Another object of my invention is to provide a heating unit having a heating element and a removable pan structure which has a solid functionally integral flange member about the top portion thereof.

A further object of my invention is to provide a heating unit supporting pan structure which is adapted to be removed from the heating element of such unit, and which includes a solid ring-like supporting member and a bottom portion functionally integral therewith.

A still further object of my invention is to provide a simple, rugged, dependable, inexpensive supporting pan structure for a heating unit which includes a functionally integral ring-like supporting member, and a plurality of bottom portions with at least one bottom portion being removable from the ring-like member.

Other objects of my invention will either be pointed out specifically in the course of the following description of a device embodying my invention, or will be apparent from such description.

In the accompanying drawings:

Figure 1 is a sectional view of a heating unit embodying my invention resting upon a supporting platform in its normal operating position taken along line I—I of Fig. 2;

Fig. 2 is a sectional view taken along the line II—II of Fig. 1;

Fig. 3 is a sectional view taken along the line III—III of Fig. 2 with the supporting arms being shown in dotted outline;

Fig. 4 is a fragmentary sectional view similar to Fig. 3 illustrating a modified hinging arrangement;

Fig. 5 is an enlarged fragmentary view taken along the line V—V of Fig. 3 illustrating a portion of the device embodying my invention; and, Fig. 6 is a perspective view of the heating unit shown in Fig. 1 in its elevated position with the heating element and pan structure thereof retained above the range platform and with the supporting pan structure partially removed from the heating element.

Referring to the accompanying drawings, in which like reference characters indicate like parts in the several figures, I show a heating unit 10 including a heating element 12, a supporting pan structure 14 adapted to support the unit 10 on a range platform, hotplate surface, or the like, 16 during the normal operation of such unit, and an elevating supporting structure 18 adapted to support the unit 10 in an elevated position above the platform when it is desired to clean such unit.

The heating element 12, in this instance, comprises an open grid formed of two sheathed members arranged in a spiral, in a well known manner. The sheathed members each comprise a resistor 20 embedded within a suitable insulating material 22 and surrounded by a metal sheath 24 in a well known manner. The insulating material 22 is preferably magnesium oxide or the like and may be positioned within the metallic sheath or envelope 24 in a powdered form. The metallic sheath is formed of any suitable material which will permit the heating element 12 to operate satisfactorily at a high temperature corresponding to red heat.

The sheath members are, in this instance, formed into two separate substantially concentric spirals and may be of either similar or varying wattages. The substantially concentric spirals are mounted in and attached to suitable radially extending transversely grooved supporting arms 26 in a well known manner. These arms 26 are adapted to support the heating element 12 within the pan structure 14 in a manner as hereinafter described.

It is to be understood that the heating element 12 described herein and illustrated in the accompanying drawings, is used primarily for illustrative purposes, and that other suitable heating elements may be used in lieu thereof.

The ends of the tubular sheathed members extend downwardly from the main plane of the heating element 12 and terminate within suitable refractory insulating bushings 28. Suitable terminals (not shown) are located at the lower ends of the sheathed members within the bushings 28 to afford means for connecting the heating element 12 to a supply circuit (not shown). The bushings 28 are attached to a terminal block 30, which, in this instance, comprises an elongated inverted channel-like member having outwardly and downwardly sloping sides 32. The channel member is formed from any suitable metallic material and has formed therein a plurality of apertures (not shown) along the upper surface thereof for permitting the passage and retention of the bushings 28.

A terminal shield 34, preferably of metallic material, is positioned intermediate the heating element 12 and the terminal block 30 and extends substantially diametrically across the heating unit 10. The terminal shield 34, in this instance, is substantially an elongated inverted channel having outwardly and downwardly sloping sides 36 and a plurality of apertures 38 located within the upper surface thereof to afford suitable passage for the depending ends of the heating element 12. Upwardly extending collars 40 may be located about the apertures 38 to form small vertical sleeves through which the depending ends of the element pass. These collars 40 are wedged tightly against the metallic sheath heating members to prevent passage of the liquid along the surface of the depending ends of such members, and to retain the members in position as a functionally integral heating element.

Depending end portions 42 are, in this instance, located at either end of the terminal shield 34 to afford means for rigidly attaching the terminal block 30 thereto. However, it is to be understood that the terminal shield 34 and terminal block 30 may be rigidly attached together or to the heating element 12 in any other desired manner.

It is, therefore, obvious that the heating element 12, terminal shield 34 and terminal block 30 being rigidly attached together, will move as a functionally integral unitary structure substantially as hereinafter described.

The sloping sides 36 of the terminal shield 34 direct any spillage or sloppage which might pass through the open heating element 12 outwardly away from the lower or terminal ends of the heating element 12. This structure thus adequately protects the terminals and insulating bushings 28 from any extraneous matter which might pass down through the unit and along the depending ends of the sheathed members thereof.

The pan structure 14, in this instance, comprises a ring-like supporting member 44 and at least two half dish-shaped bottom portions 46 and 48, which cooperate to form an open pan-like structure or vessel having a depressed central portion with a substantially horizontally disposed bottom. The ring-like flange member 44 includes a depending sleeve portion 43 and an overhanging lip 52 which is located about the upper periphery thereof to afford means for supporting the pan structure 14 within the aperture 17 in the range platform 16, as hereinafter described.

One of the bottom portions, say 46, is rigidly attached to the ring-like member 44 and is, in this instance, formed separate therefrom and spot-welded thereto to form a functionally integral structure therewith. However, it is to be understood that, if desired, such bottom portion may be formed integral therewith. The ring-like member 44 and the functionally integral bottom portion 46 thus form a structure having a cylindrical ring-like top and a substantially half bottom.

The second bottom portion 48 is formed separate from the ring-like member 44. However, such bottom portion is movably or removably attached to the ring-like member. The second bottom portion 48 is, in this instance, hinged to the member 44 by means of the hinge structure 45 and, in this instance, rotates about such hinge structure in a plane substantially parallel to the first bottom portion 46. Accordingly, it follows that when the movable bottom portion 48 is located beneath and within the confines of the ring-like member 44, the pan structure 14 has a substantially uniform bottom covering the lower portion thereof.

The movable half dish-shaped bottom portion 48 is retained in its engaged position with respect to the ring-like flange member 44 by means of a suitable latching device 56. Accordingly, it follows that with the movable pan portion movably attached to the ring-like member at one end by means of the hinge structure 45 and latched to the ring-like member at the other end by means of the latching device 56, the supporting pan structure 14 comprises a functionally integral structure having a portion of the bottom movable with respect to the ring-like member.

Suitable inwardly extending wedge-like keying members 66 are rigidly attached to or formed within the side portions of the movable bottom portion 48. The keys 66 are adapted to cooperate with the central portion 54 of the ring-like member 44 by passing through suitable cooperating slots 68 within the depending sleeve portion 43 thereof. The keying members 66 engage the slots 68 within the sleeve portion as the movable bottom portion 48 is rotated from its open position to its closed or engaged position. This cooperation of the key-like member 66 within the slots 68 as the movable portion 48 is moved into its cooperative engagement with the ring-like member 14, prevents the movable bottom portion 48 from being moved vertically with respect to the ring-like member 14. The cooperation of the keys 66 with notches 68 and latching means 56 thus causes the movable portion 48 to be bound tightly against the depending sleeve portion 43 of the ring-like member 44 to insure a functionally integral pan structure 14. However, tapered notched ends 62 of the radially supporting arms 26 cooperate with the lugs 60 in the bottom portions 46 and 48 to insure the continued cooperation of the pan structure during the normal operation of the unit, as hereinafter described.

An elongated gap 58 (see Figs. 2, 3 and 6) is located between the adjacent bottom portions 46 and 48 when such portions are cooperatively engaged with the ring-like member. This gap permits the free passage of the depending ends of the heating element 12 through the pan structure 14, and permits the pan structure 14 to be located about the heating element 12 without causing any binding action therebetween.

Suitable supporting lugs 60 are either stamped within or rigidly attached to the sides of the half dish-shaped bottom portions 46 and 48 for retaining the heating element 12 when the heating unit 10 is in its operative position upon the supporting platform 16. The lugs 60 extend within the depressed central portion of the pan structure 14 by passing through notches 61 within the depending sleeve portion 43 of the ring-like member 44. The lugs 60 are thus adapted to support the heating element 12 through the cooperation of the radially extending arms 26 which rest thereon when the unit is in its normal operating position.

A tapered notch 62 is located on the lower surface of the ends of the radially extending supporting arms 26. These notched ends 62 are adapted to extend downwardly within lugs 60 in the pan structure 14 when the element 12 is retained by the pan structure 14 in its normal operating position, to prevent the outward movement of the movable bottom portion 48. The radially extending arms 26 thus, through the cooperation of the lugs 60 and notched portion 62, lock the supporting pan portions 46 and 48 together and prohibit any relative horizontal movement between the heating element 12 and the pan structure 14.

Suitable apertures 64, arcuate in shape, in this instance, are located within the bottom portions 46 and 48 and a portion of the bottoms is bent downwardly to provide louvers to permit the free passage of any extraneous matter which may pass beneath the heating element 12. The bottom portions 46 and 48 are inclined or tapered towards the apertures 64 to readily guide such extraneous matter towards the apertures. The bottom portions 46 and 48, in cooperation with the terminal shield 34, thus prevent any of the sloppage or extraneous matter passing beneath the heating element 12 from coming in contact with the terminal ends of the tubular heating members.

When assembling the surface unit 10 embodying my invention, the heating element 12, terminal block 30, terminal shield 34 and the elevating structure 18 are united as a functionally integral structure as hereinabove described. The pan structure 14 is then located about the heating element 12 with the bottoms of the half dish-shaped bottom portions 46 and 48 located intermediate the element 12 and terminal shield 34.

The unit 10 is then located within the aperture 17 in the platform 16, whereupon the over-hanging lip 52 of ring-like member 44 rests upon the ledge 19 adjacent the aperture. The radially extending arms 26 then rest upon the lugs 60 and retain the element 12 slightly above the surface of the platform 16. In addition, the tapered notched ends 62 of the arms 26 cooperate with the lugs 60 to retain the unit 10 as a functionally integral structure.

When it is desired to clean the unit 10 embodying my invention, when it is positioned upon the platform 16 in its normal operating position, an operator merely grasps the heating element 12 and lifts the unit upwardly through the aperture 17. The unit is lifted upwardly beyond the platform 16 until the elevating supporting structures 18 partially pass through a notch 21 in ledge 19 and are adapted to cooperate with such ledge 19. The unit is then slightly rotated, permitting the elevating supporting structure 18 to support the unit in an elevated position above the platform 16 (see Fig. 6), as is more fully described in the copending W. J. Russell application referred to hereinabove. However, it is to be understood that the unit may be retained in an elevated position, in any manner, as so disclosed by W. J. Russell or in any other suitable manner.

The operator then merely unlatches the latching device 56 upon the pan structure 14 and moves or rotates the movable bottom portion 48 about the hinge structure 45 so that such bottom portion is bodily displaced from beneath the ring-like member 44 (see Fig. 6). The supporting pan structure 14 may then be slightly inclined with respect to the plane of the heating element 12 and moved along the plane of such heating element in a direction away from the normal position occupied by the movable bottom portion 48. A portion of the ring-like flange member 44 will thus pass above the heating element 12, permitting the pan structure 14 to be easily removed from such heating element. The pan structure 14 may then be removed to a suitable dishpan and thoroughly cleaned. Likewise, while the heating unit 10 is in an elevated position and with the pan structure 14 removed therefrom, the operator may thoroughly clean the heating element 12 and terminal shield 34.

After thoroughly cleaning the unit 10, the pan structure 14 may be easily and readily positioned about the heating element 12 by passing the open portion of the ring-like member 44, or that portion from which the movable pan portion 48 has been removed, over the heating element and lowering such member in place about such element. With the ring-like member 44 in place about the heating element 12, the movable bottom portion 48 may then be rotated about the hinge structure 45 so as to be located beneath the heating element 12. The movable bottom portion 48 then cooperates with the ring-like member 44 and bottom portion 46 and is retained in such cooperation by means of the latching member 56 and keying members 66, as hereinabove described. The unit 10 may then be returned to its normal operating position upon the range platform, whereupon the overhanging lip portion 52 of the flange-like member 44 will retain the unit 10 in its normal operating position upon such platform. The radially extending arms 26 then cooperate with the lugs 60 to support the heating element and to bind the unit into a functionally integral structure.

If it be desired, a movable bottom portion 48', similar to bottom portion 48, may be removably attached to the ring-like flange member 44 by utilizing an elongated key member 70 at the rear end, or that opposite to the latching device 56, of such movable portion 48 (see Fig. 4), instead of the hinge structure 45. The key 70 cooperates with a suitable relatively elongated aperture 72 in the depending sleeve portion 43 of ring-like member 44 and cooperatively functions as a hinging means for the movable bottom portion. The removable pin 70 acts as a fulcruming member and permits the bottom portion 48' to be freely removed from the member 44. When the pin 70 is located within aperture 72, the bottom portion may rotate thereabout, permitting the movable bottom portion 48' to be positioned in cooperative engagement with the ring-like member 44 and bottom portion 46 in a manner, as hereinbefore described. The operation of the pan structure 14 having a removable bottom portion 48' instead of the movable bottom portion 48, as hereinabove described, would be substantially as hereinabove described except that the movable bottom portion 48' would be entirely removable from the ring-like flange member 44, rather than being hinged and movable with respect thereto.

It is, therefore, obvious that the heating unit embodying my invention provides a functionally integral ring-like supporting pan structure having a plurality of bottom portions with at least one of said portions being either movable with respect to or removable from the ring-like structure whereby the pan structure may be easily and readily removed from the heating element for cleaning purposes.

Various other modifications may be made in the device embodying my invention without departing from the spirit and scope thereof, and I desire, therefore, that only such limitations shall be placed thereon as are imposed by the prior art and the appended claims.

I claim as my invention:

1. In an electrically-heated unit for assembly to a range platform, the combination of a heating element disposed in a substantially horizontal plane adjacent the plane of the platform during normal use and movable to an elevated position for cleaning, said heating element including a depending terminal structure movable with the element, and a pan structure disposed in part beneath the element and including an outwardly-extending flange encompassing the element and normally resting upon the platform, a segmental bottom wall fixed to a portion of the flange and extending beneath a portion of the element and on one side of the terminal structure, a second segmental bottom wall extending beneath the element on the opposite side of the terminal structure and movable with respect to the flange, said second segmental bottom wall defining, with the first-mentioned segmental bottom wall, a heat-reflecting bottom portion of the pan structure, and hinge means connecting the segmental bottom walls at one side thereof beneath the flange and providing for separation of the bottom walls from the terminal structure when the element has been moved to its elevated position.

2. The combination as claimed in claim 1 including a plurality of supports spaced on said segmental bottom walls for carrying the heating element during normal use of the unit.

3. In an electrically-heated unit for assembly to a range platform, the combination of a heating element disposed in a substantially horizontal plane adjacent the plane of the platform during normal use and movable to an elevated position for cleaning, said heating element including a depending terminal portion movable with the element, and a pan structure disposed in part beneath the element and including a flange encompassing the element and resting upon the platform, a sleeve depending from said flange and having an inwardly-extending projection formed on one portion thereof and an opening formed in a second portion thereof, a segmental bottom wall extending beneath the element on one side of said terminal structure and fixed to the portion of the sleeve containing said projection, a movable segmental bottom portion including a bottom wall extending beneath the element and said sleeve on a second side of the terminal structure and an upwardly-extending segmental side wall fixed to the movable bottom wall, said side wall being arranged contiguous a portion of said sleeve and having a projection formed thereon which extends through said opening in the sleeve, said first and second-mentioned projections defining a support for the heating element, and a hinge connecting said sleeve and movable bottom portion and providing for movement of the movable bottom portion outwardly from beneath the heating element.

4. In an electrically-heated unit for assembly to a range platform, the combination of a substantially circular heating element disposed in a plane adjacent the plane of the platform during normal use and movable to an elevated position for cleaning, said heating element including a depending terminal structure movable with the element and extending diametrically of the element, and a pan structure disposed in part beneath the element and including an annular flange encompassing the heating element and normally resting upon the platform, a sleeve depending from said flange and having inwardly-extending projections circumferentially spaced on one portion thereof and spaced openings formed in a second portion thereof, a segmental bottom wall extending beneath the element on one side of said terminal structure and having its outer periphery fixed to the portion of the sleeve containing said projections, a movable segmental bottom member including a bottom wall extending beneath the element and said sleeve on a second side of the terminal structure and an upwardly-extending segmental side wall fixed to the movable bottom wall, said side wall being arranged contiguous the outer side of the portion of said sleeve which includes said openings, said side wall having spaced projections formed thereon which extend inwardly through the openings in the sleeve, said first and second-mentioned projections defining a support for the heating element, hinge means connecting said sleeve and said side wall for permitting movement of the movable bottom member outwardly from beneath the heating element, and a latch for maintaining the movable bottom member in position adjacent one side of the terminal structure during normal use of the unit.

PAUL W. GREEN.